US007356384B2

(12) United States Patent
Gull et al.

(10) Patent No.: US 7,356,384 B2
(45) Date of Patent: Apr. 8, 2008

(54) LOAD MANAGEMENT SYSTEM

(75) Inventors: Philip Gull, New Berlin, WI (US); Wesley C. Sodemann, Dousman, WI (US); Kenny J. Stair, North Prairie, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 37 days.

(21) Appl. No.: 11/180,228

(22) Filed: Jul. 13, 2005

(65) Prior Publication Data

US 2006/0018069 A1    Jan. 26, 2006

Related U.S. Application Data

(63) Continuation-in-part of application No. 11/086,167, filed on Mar. 22, 2005.

(60) Provisional application No. 60/676,392, filed on Apr. 29, 2005, provisional application No. 60/588,073, filed on Jul. 15, 2004.

(51) Int. Cl.
   G05D 11/00    (2006.01)
   G05D 17/00    (2006.01)
   G05D 3/12     (2006.01)
   G05D 5/00     (2006.01)
   G05D 9/00     (2006.01)
   G05D 23/00    (2006.01)

(52) U.S. Cl. .............. 700/295; 700/286; 700/276; 700/300

(58) Field of Classification Search ........... 700/295, 700/287, 286, 22, 28, 31, 276, 278; 307/39; 361/90, 1

See application file for complete search history.

(56) References Cited

U.S. PATENT DOCUMENTS

| 4,066,913 | A | * | 1/1978 | Manning et al. ............. 307/38 |
| 4,075,699 | A |   | 2/1978 | Schneider et al. |
| 4,324,987 | A | * | 4/1982 | Sullivan et al. ............. 307/35 |
| 4,349,879 | A |   | 9/1982 | Peddie et al. |
| 4,499,385 | A |   | 2/1985 | Slavik |

(Continued)

FOREIGN PATENT DOCUMENTS

WO    WO 01/37392    5/2001

OTHER PUBLICATIONS

Intellitec SMART EMS Installation and Service Manual, (P/N 53-22124.100), Oct. 10, 1997.

(Continued)

*Primary Examiner*—Zoila Cabrera
*Assistant Examiner*—Nate Laughlin
(74) *Attorney, Agent, or Firm*—Michael Best & Friedrich LLP

(57) ABSTRACT

A method, and a system that uses the method, of managing loads for residential use. The method includes connecting a first signal-responsive switch to a first load, and connecting a second signal-responsive switch to a second load that has a lower priority than the first load. The method also includes sensing first and second electrical signals from the respective first and second loads, and ensuring the first signal-responsive switch is in a CLOSED state and the second signal-responsive switch in an OPEN state after both a combination of the sensed first and second electrical signals exceeds a first threshold value and the sensed first electrical signal is below a second threshold value.

11 Claims, 11 Drawing Sheets

U.S. PATENT DOCUMENTS

| | | |
|---|---|---|
| 4,617,472 A | 10/1986 | Slavik |
| 4,620,283 A | 10/1986 | Butt et al. |
| 4,695,991 A | 9/1987 | Hudson |
| 4,916,328 A | 4/1990 | Culp, III |
| 5,422,517 A | 6/1995 | Verney et al. |
| 5,923,830 A | 7/1999 | Fuchs et al. |
| 6,172,432 B1 * | 1/2001 | Schnackenberg et al. ..... 307/23 |
| 6,487,509 B1 * | 11/2002 | Aisa ........................... 702/62 |
| 6,507,164 B1 | 1/2003 | Healey et al. |
| 6,510,369 B1 | 1/2003 | Lacy |
| 6,590,304 B1 | 7/2003 | Manning et al. |
| 6,633,802 B2 | 10/2003 | Sodoski et al. |
| 6,652,330 B1 | 11/2003 | Wasilewski |
| 7,010,363 B2 * | 3/2006 | Donnelly et al. ............. 700/19 |
| 7,015,599 B2 | 3/2006 | Gull et al. |
| 7,119,457 B1 * | 10/2006 | Flegel ........................ 307/64 |
| 2001/0030468 A1 | 10/2001 | Anderson et al. |
| 2002/0024332 A1 * | 2/2002 | Gardner .................. 324/103 R |
| 2005/0107892 A1 * | 5/2005 | Matsui et al. ................. 700/28 |

OTHER PUBLICATIONS

Intellitec 50 AMP Smart Energy Management System Installation and Service Manual, (P/N 5300684B00), Mar. 1, 2000.

Intellitec Powerline Energy Management System Installation and Service Manual, (P/N 5322100A100), at least as early as Mar. 22, 2003.

Intellitec Energy Management Unit 2 (EMU2) Service Manual, (P/N 53-22083A100), at least as early as Mar. 22, 2003.

Generac Power Systems, Inc., PowerMaster Technical Manual, 16 pages, dated Apr. 7, 2006.

* cited by examiner

| FUEL | 10 KW | 12 KW | 15 KW | 17 KW |
|---|---|---|---|---|
| LP | 41.7 A | 50 A | 62.5 A | 70.8 A |
| NG | 37.5 A | 45.8 A | 58.3 A | TBA |

LOAD MANAGEMENT SYSTEM

RELATED APPLICATIONS

This application claims the benefit of U.S. Provisional Patent Application No. 60/588,073, filed on Jul. 15, 2004, and U.S. Provisional Patent Application No. 60/676,392 filed on Apr. 29, 2005; and is a continuation-in-part of U.S. patent application Ser. No. 11/086,167, filed on Mar. 22, 2005, entitled "Residential Load Power Management System", and assigned to the assignee of this application, all of which applications are incorporated by reference herein.

BACKGROUND

The invention relates to power management, and more particularly, to residential power management.

When there is a residential power outage, back up power may be provided by a standby generator. In some cases, the standby generator is started automatically after the power outage. A standby generator that can be started automatically usually requires an automatic transfer switch. The combination of a standby generator and an automatic transfer switch is generally expensive. In some other cases, the standby generator will normally be turned on either manually or automatically to provide a limited amount of power to the residence due to an amperage limit of the standby generator. Therefore, only limited power is provided to the residence with some standby generators. In other words, a standby generator with a low amperage rating can limit the types of and number of appliances connected to the standby generator. Exemplary appliances that draw large amounts of current include air conditioners, hot water heaters, and on-demand appliances such as microwave ovens and toasters.

Standby back up generators and automatic transfer switches are also known. However, standby back up generators with low power ratings can still be overloaded when more power is demanded than can be supplied by the generators. Furthermore, standby back up generators with high power ratings are much more costly.

SUMMARY

The invention provides a load management system for managing a plurality of loads in a residence. The load management system includes at least one current transformer configured to monitor current input from a standby or portable generator. The load management system also includes a plurality of fuel type switches and generator rating switches. The fuel type switches allow a user or an operator to select a fuel type used by the generator at installation. Similarly, the generator rating switches allow the operator to select a generator rating of the generator at installation. The load management system also includes a plurality of prioritized relays having the same power ratings. Settings of the switches, and relay priorities are fixed at installation by the operator. Having the same power ratings at all relays simplifies the installation process. When a high demand appliance is connected to the system while the system is already fully loaded, contacts connecting the standby generator to the appliance will remain open until another high demand load is automatically or manually disconnected. The operator therefore manually decides the priority of at least some of the loads in the residence.

In one form, the invention provides a load management system for residential use. The system includes first and second signal-responsive switches that are connected to respective first and second loads, a sensor that senses first and second electrical signals from the respective first and second loads, and a controller. The first signal-responsive switch has a first priority; and the second signal-responsive switch has a second priority that is lower than the first priority. The controller ensures that the first signal-responsive switch is in a CLOSED state and the second signal-responsive switch is in an OPEN state after the sensor has sensed that a combination of the first and second electrical signals exceeds a first threshold value and that the first electrical signal is below a second threshold value.

In another form, the invention provides a method of managing loads for residential use. The method includes connecting a first signal-responsive switch to a first load, and connecting a second signal-responsive switch to a second load that has a lower priority than the first load. The method also includes sensing first and second electrical signals from the respective first and second loads, and ensuring the first signal-responsive switch is in a CLOSED state and the second signal-responsive switch in an OPEN state after both a combination of the sensed first and second electrical signals exceeds a first threshold value and the sensed first electrical signal is below a second threshold value.

While standby backup generator systems that manage load capacity and control an associated transfer switch are generally known, these backup systems are typically used in commercial settings such as offices, and can be costly. These backup systems generally require complicated installation procedures, and offer more features than an average residence can utilize. Some of the offered features and functions can also be impractical for the average residence. Furthermore, frequencies and durations of power outages in an average residence are low and short in general, respectively. As a result, an average residence will find it hard to justify the expense for these standby generator systems and for the functions and features that are unnecessary.

Thus, the invention provides the average residence with systems that offer the convenience of being able to manage a limited or reduced number of loads such as an air conditioning unit and a hot water heater, without the expense of more complicated systems. For example, the average residence may control a maximum of two high-load appliances with the present system. Since the present invention is less complicated, fewer parts are used which then reduces the cost of manufacturing and the price.

The systems according to the present invention may also include inexpensive jumpers and/or switches that allow for connection with different generators with different ratings and fuel types. All of these aspects lower the cost for the systems according to the present invention, making the systems more appealing and practical for the average residence. In other words, the systems offer flexibility while providing some of the functions that are suitable for average residences at relatively lower costs, and are less complicated than expensive, commercial load management systems.

Other features and advantages of the invention will become apparent to those skilled in the art upon review of the following detailed description, and drawings.

BRIEF DESCRIPTION OF THE DRAWINGS

FIG. 6b is a continuation of the flow chart of FIG. 6a.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

As should also be apparent to one of ordinary skill in the art, the systems depicted in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "controller" may include or refer to both hardware and/or software. Furthermore, throughout the specification capitalized terms are used. Such terms are used to conform to common practices and to help correlate the description with the coding examples, equations and/or drawings. However, no specific meaning is implied or should be inferred simply due to the use of capitalization. Thus, the claims should not be limited to the specific examples or terminology or to any specific hardware or software implementation or combination of software or hardware.

Embodiments of the invention relate to a method and system for managing loads powered by a home or residential generator in an event of utility power outage. The system adds and sheds a prioritized load based on the electrical power, voltage, and current generated by the generator, and also based on the electrical power, voltage, and current demanded by the loads in the residence. In one specific embodiment, the system determines the electrical power, voltage, and current generated by the generator from switch settings, monitors the electrical power, voltage, and current demands from the loads, and adds or sheds the loads based on some predetermined parameters.

Figure 1:
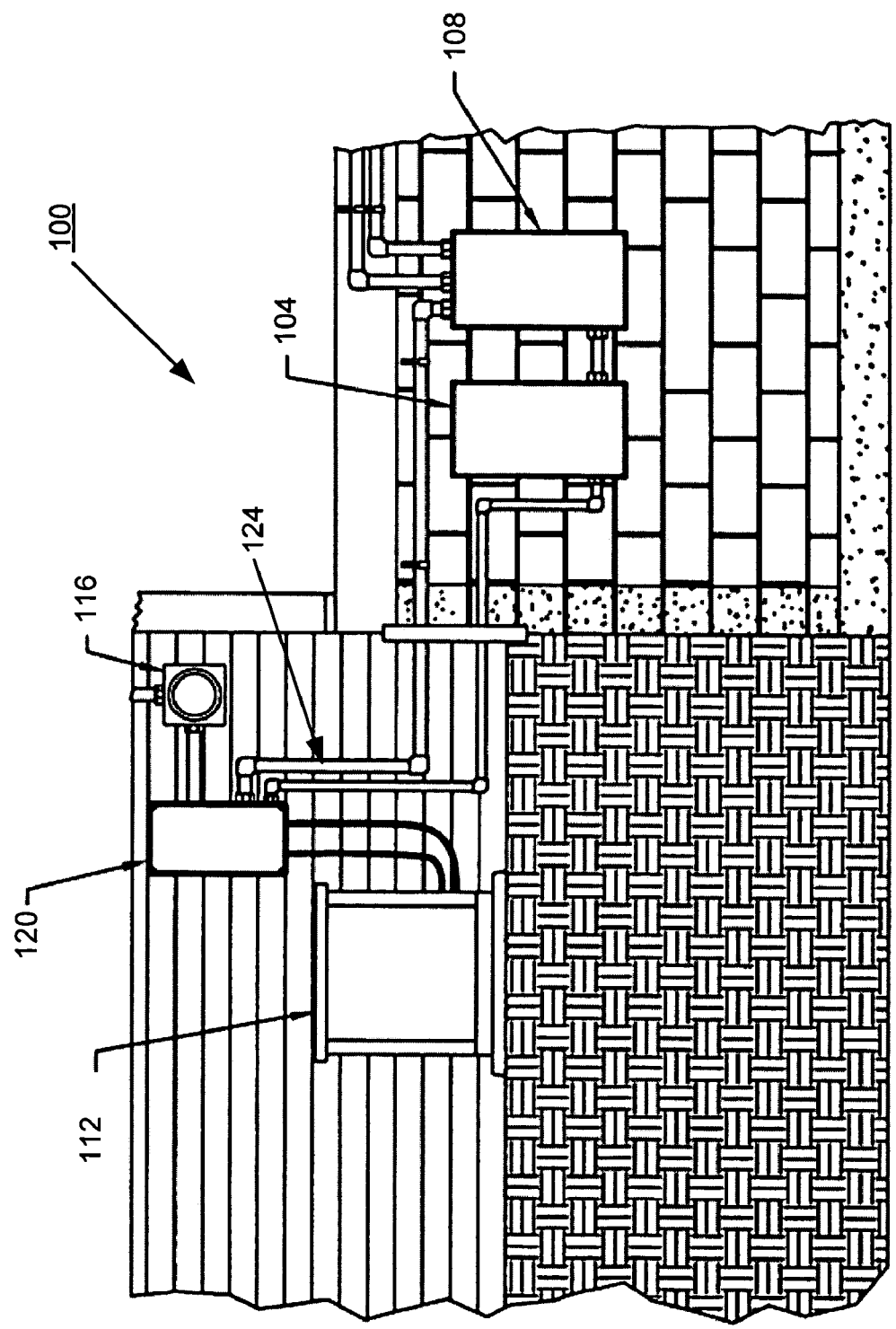
FIG. 1 is a residential electrical system having a load management system.

FIG. 1 depicts a load management system 100 disposed in a residence embodying the invention. The load management system 100 includes a load shed center 104 that is connected to a breaker box or a load distribution panel 108. Power from sources such as a home standby generator or a portable generator 112 and a utility source 116 is connected to a junction box or a transfer switch 120 outside of the residence. In some embodiments, the transfer switch 120 can be installed inside the residence. The transfer switch 120 is also connected to the load shed center 104 and the breaker box 108 via a plurality of conduits 124. The operation of the load management system 100 is detailed hereinafter.

Figure 2:
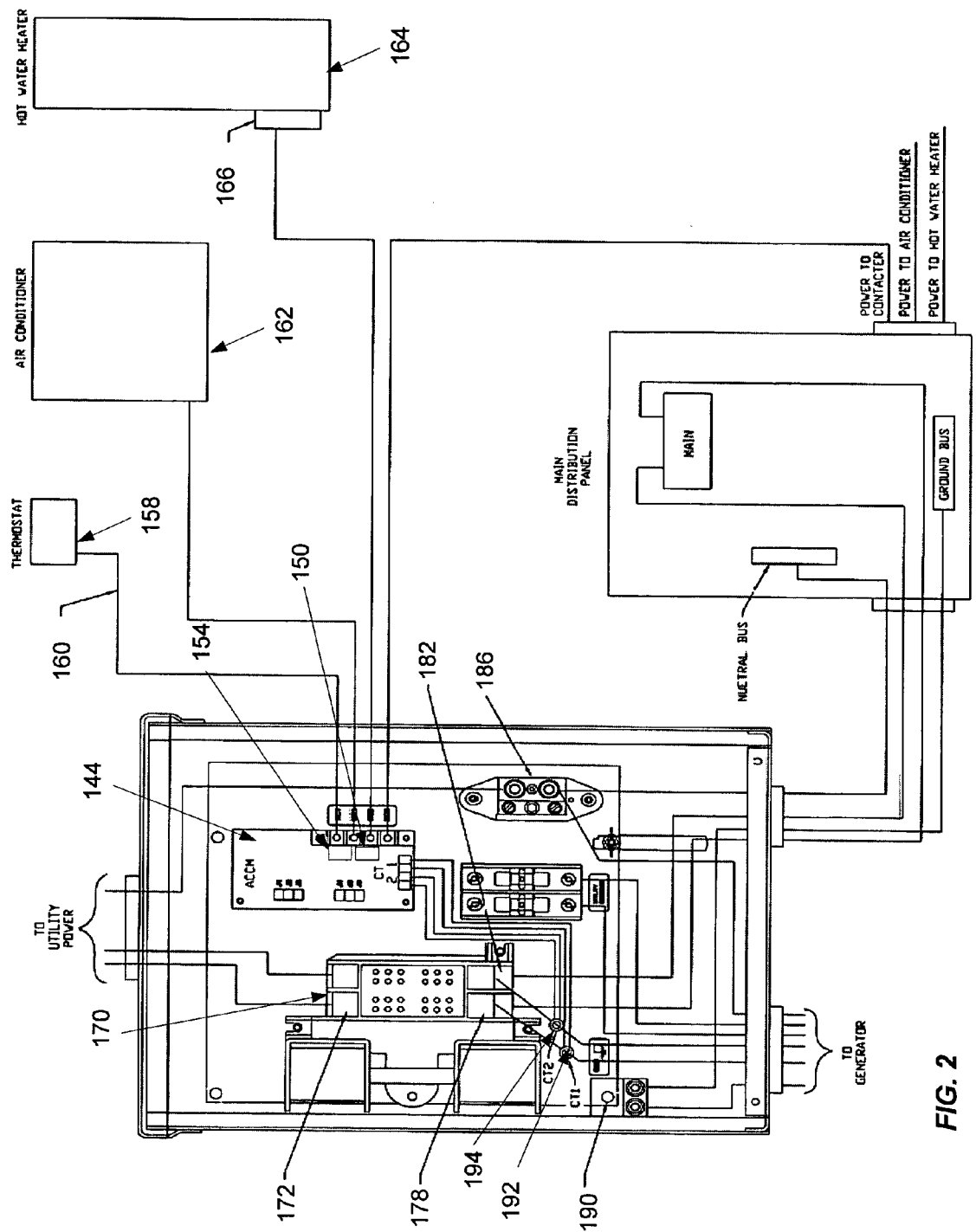
FIG. 2 is a system block diagram of the load management system depicted in FIG. 1.

In some embodiments, the load management system 100 also includes a load-management-control board in the transfer switch 120. Alternatively, the load-management-control board can also be implemented in the load shed center 104, or the breaker box 108. FIG. 2 depicts a schematic view of the transfer switch 120 that includes a load-management-control board 144 which is connected to a thermostat 158 via a thermostat control wire or a thermostat control conductor 160. The load-management-control board 144 is connected to some high power consumption loads such as an air conditioner 162 and a hot water heater 164 via a contactor 166. Furthermore, the transfer switch 120 also includes a second contactor 170 that receives power from the utility source 116 at a utility connection 172, and from the standby generator 112 at a generator connection 178. The contactor 170 also has a load connection 182 that is connected to the loads such as the air conditioner 162 and the hot water heater 164. The transfer switch 120 also includes a neutral terminal 186 for connecting to the neutral inputs of the generator 112 and of the utility source 116, and a ground lug 190 for proper electrical protection.

To provide power from either the generator 112 or the utility source 116 to the loads such as the air conditioner 162 and the hot water heater 164, the load-management-control board 144 includes a plurality of prioritized relays 150, 154. In some embodiments, when the utility source 116 is supplying power to the residence, relays 150 and 154 are not energized, and a plurality of contacts remain in a normally closed position. However, when there is a utility power outage, the load-management-control board 144 takes control of the relays 150 and 154. That is, after the utility source 116 fails, the load-management-control board 144 starts to transfer to generator power. Specifically, the load-management-control board 144 monitors both incoming generator lines through a pair of current transformers ("CT's") 192 and 194, and determines if there is enough power available to start the air conditioner ("A/C") or other large loads by the generator 112.

Figures 3, 4:
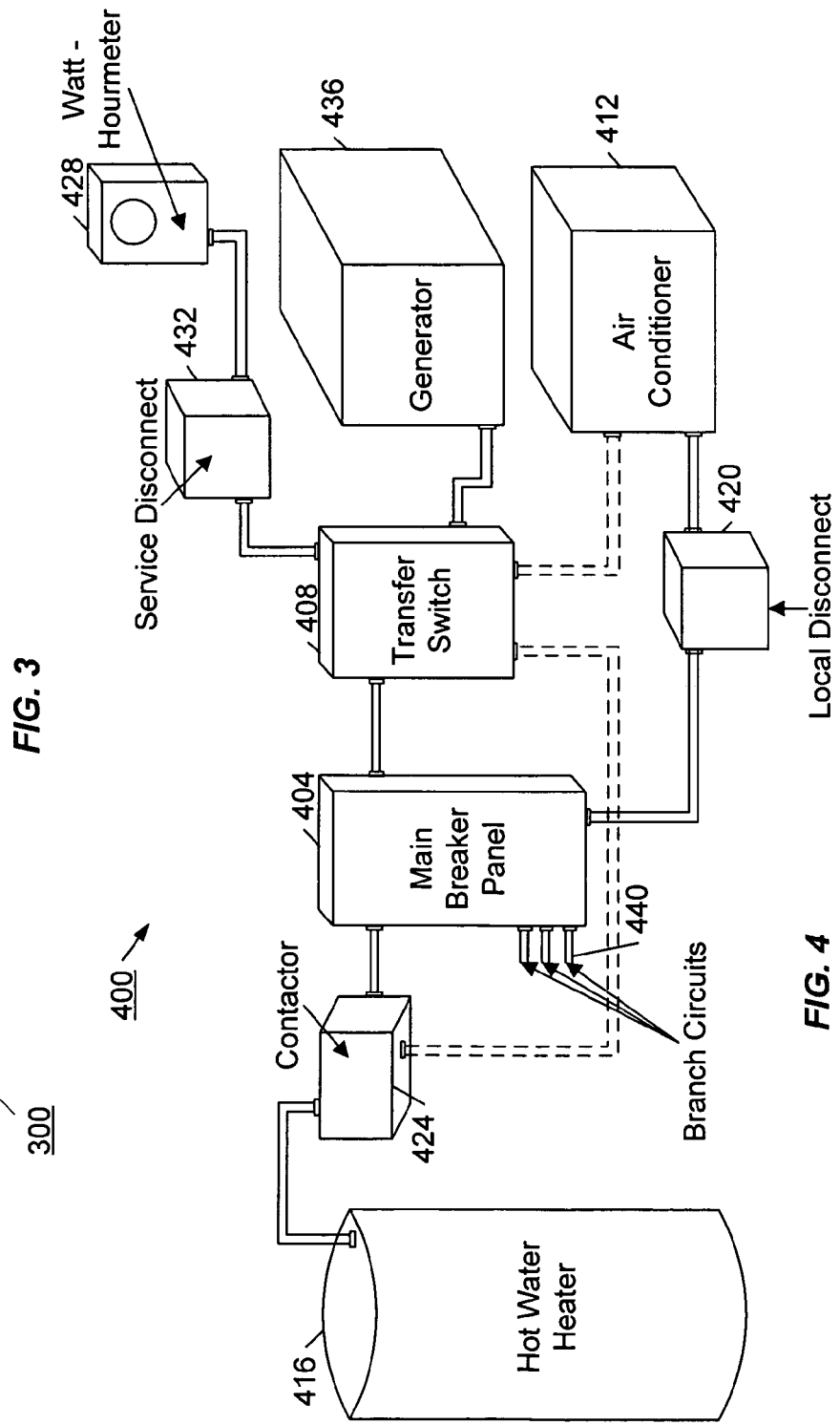
FIG. 3 is a fuel power table for the load management system depicted in FIG. 1.
FIG. 4 is a second residential electrical system having a load management system.

Depending on the position of a fuel source dip switch for liquid propane ("LP") or natural gas ("NG"), the load-management-control board 144 can determine that the generator 112 is either operating at rated wattage with LP or a reduced wattage with NG, as listed in FIG. 3. When one of the current transformers ("CT's") 192, 194 detects a current reaching or approaching a first percentage amount, for example 85 percent, or 30 A, of rated load capacity, the load-management-control board 144 energizes or opens the relay 150 or 154. In this way, the load-management-control board 144 can start shedding loads based on the lowest priority and advances to the highest priority. The priorities are typically fixed at installation, with relay 150 or "A/C" being the last to shed, and the first to be added, and the relay 154 or hot water heater or other large loads being the first to shed and the last to be added.

In some other embodiments, the load-management-control board 144 also monitors the current at the relays 150 and 154 demanded by the loads such as the air conditioner 162 and the hot water heater 164. In this way, the priority or the sequence of load shedding and adding can be adjusted based upon the actual demands from the loads. For example, if the relay 150 is idle or not asking for or demanding any current, the load-management-control board 144 can close the relay 154.

In some embodiments, the load-management-control board 144 also controls the transfer switch 120. The transfer switch 120 monitors a utility voltage, and determines when the utility power 116 is not present or at a low level when compared with a predetermined threshold. For example, when the load-management-control board 144 senses that the generator 112 has been started, the load-management-control board 144 will start to control the current supplied to the loads through the relays 150, 154. After the generator 112 is running or operating at a rated speed and voltage for a predetermined amount of time delay, the second contactor 170 transfers power from the utility source 116 to the generator 112. Typically, the time delay is between 30 seconds and 50 seconds. However, the time delay may be longer in a colder region in which the generator 112 may take longer to warm up, or shorter in a warmer region in which the generator 112 may warm up faster.

Once the generator 112 is supplying power, the load-management-control board 144 will transfer the generator power to the loads. The load-management-control board 144 checks to ensure that power from the generator 112 is supplied to the loads for a predetermined minimum amount of time, such as five minutes. In some embodiments, the load-management-control board 144 can also be configured to perform reverse monitoring. For example, when the load-management-control board 144 senses that the utility power 116 has been restored, the load-management-control board 144 will also monitor the utility power for a period of time, and will transfer the loads to utility power once the utility source 116 has stabilized. In some embodiments, when the power transfers from the utility source 116 to the generator 112, the load-management-control board 144 ensures that the transfer will last for a predetermined minimum amount of time, such as five minutes. These minimum time periods avoid some power transfers if the utility power flickers on and off.

In yet other embodiments, the relays 150 and 154 are usually kept closed when utility power is supplied. However, during a power outage, the relays 150 and 154 may be automatically opened to ensure that no power is provided to any connected loads thereby protecting the loads, the generators, and any associated electronics from an instantaneous overload if the managed loads are drawing power when generator power is first supplied. The relays 150 and 154 can be controlled by some normally closed contacts. In such a case, the contacts keep the relay 150 and 154 closed when the utility power is supplied. However, the solenoid will be de-energized or deactivated such that the relay contacts 150 and 154 are opened when the load-management-control board 144 senses that the utility power from the utility source 116 is not available. Alternatively, normally closed relays could be used, and the relays 150 and 154 would open when generator power is available. Furthermore, if the load-management-control board 144 is configured to react to a power outage fast enough, the relays 150 and 154 can be configured to be kept closed even when a power outage occurs.

In some embodiments, when powered by the generator 112, the load-management-control board 144 can manage two protected circuits such as the air conditioner 162 and the hot water heater 164. For example, the load-management-control board 144 monitors and records a total amount of current drawn by the loads or appliances applied in the building such that the total amount of current drawn by these loads or appliances is below some limit, which may be fixed or adjustable. Furthermore, the load-management-control board 144 is generally housed in either a NEMA 1 or NEMA 3R enclosure, which is rated for operational temperatures from −32° F. to 104° F. Although two types of enclosures may be used, other enclosures that satisfy other technical requirements can also be used.

Furthermore, the load-management-control board 144 through the CT's 192, 194 monitors the incoming lines and manages the total current drawn at or below a preset maximum amount, for example, 85 percent, of the rated load of the generator 112. The load-management-control board 144 generally includes some memory that stores the preset amounts, among other things.

The load-management-control board 144 also monitors a plurality of power-related switches such as the set of power rating switches or jumpers, and the set of fuel type switches or jumpers. In some embodiments, the jumpers and the switches are positioned on the load-management-control board 144. Alternatively, the jumpers and the switches are positioned in the transfer switch 120. The optional power rating switches allow an operator to switch between a plurality of generator output powers, for example, 10 Kilowatts ("KW"), 12 KW, 15 KW, or 17 KW. Of course, other generators with different output powers can also be used.

In some other embodiments, the load-management-control board 144 does not include any power rating switches. That is, the load-management-control board 144 is set for a particular power rating, for example, 12 KW. The load-management-control board 144 that offers only a set power rating thus yields a lower cost embodiment. Of course, other parts can also be eliminated to lower the cost, detailed hereinafter.

Similar to the power rating switches and jumpers, the load-management-control board 144 in some embodiments also provides a plurality of fuel type switches that allow an operator to select from a plurality of fuel types such as LP and NG to be provided to the generator 112. Although LP and NG are listed as the fuel types that the operator is to select from, other fuel types such as gasoline, diesel, and the like can also be used, depending on the fuel requirements of the generator 112. In this way, the load-management-control board 144 can also be used in a variety of applications to reduce overall manufacturing cost.

Depending on the fuel type, a generator 112 operates either at a rated wattage, or at a reduced wattage, as described. In some embodiments, the generator 112 fueled by LP provides more power, wattage, or current than the same generator 112 fueled by NG. Particularly, FIG. 3 depicts a fuel power table 300 listing a plurality of current amounts generated by differently-rated generators fueled by different fuel types. The table 300 lists, for example, that a generator rated at 10 KW fueled by LP produces 41.7 A, which is 4.2 A more than the same generator but fueled by NG. The load-management-control board 144 then monitors the incoming lines through the CT's 192, 194 based on the settings of the power-related switches and the fuel type switches. Also, the CT's 192, 194 typically have the same ratings. However, the CT's 192, 194 can also have different ratings depending on design or user requirements.

When the CT's 192 or 194 on any line starts to detect that the current drawn reaches a preset maximum amount of the rated load, the load management system 100 starts to operate. Controllers for load shedding are well known in the art, such as those depicted in U.S. Pat. Nos. 4,499,385, 4,617,472, 6,652,330, and 6,507,164, which are incorporated herein by reference.

Under utility power from the utility source 116, the load-management-control board 144 is generally in a sleep mode. When the utility source 116 fails to supply power, the load-management-control board 144 enters a power transfer mode, in which power is transferred from the utility source 116 to the generator 112. Once in the power transfer mode, the load-management-control board 144 starts to manage and to control the loads that have corresponding relays.

As described, the load-management-control board 144 monitors both incoming lines from the generator 112, and tries to keep the generator 112 loaded below a preset maximum amount of generator load capacity. Depending on which one of the LP and NG switches is set, the generator 112 is either operating at rated wattage or at a reduced wattage. The load-management-control board 144 will determine the output power of the generator 112 based on the power rating switch or any preset power rating, and the fuel types positions. When the CT's 192, 194 on any of the power lines from the generator 112 detects that the current generated and drawn reaches the preset maximum current amount, the load-management-control board 144 starts to shed loads based on a predefined priority, from a low priority to a high priority, or from a second priority to a first priority, which is detailed below.

A load is shed by simply opening the relay contacts for the load at the respective relays 150, 154, and by keeping the relays 150, 154 in an OPEN state until the sensed current from the generator 112 is sufficiently below the preset maximum amount. When the sensed current has dropped sufficiently, the relay 150, 154 can be closed and current is supplied from the generator 112 to the loads when a demand signal (e.g. from a thermostat for the load) is present.

Generally, the preset maximum amount is 85 percent, although other percentages can also be used. When the total current drawn drops to a second preset amount of rated load, the load-management-control board 144 will start to add a load based on the higher or the first priority relay 150 first, followed by the lower or the second priority relay 154, until the load-management-control board 144 reaches the preset maximum amount. The load-management-control board 144 continues to operate this way until other situations such as the load-management-control board 144 switches back from the generator 112 to the utility position arise. The second preset amount is generally 60 percent, although other percentages can also be used.

For example, when the relay 150 is the first priority relay and is connected to the A/C 162, when the relay 154 is the second priority relay and is connected to the hot water heater 164, if both the A/C 162 and the hot water heater 164 are running and drawing a power of 70 percent of the maximum power or wattage capability determined by the load-management-control board 144, and if an additional load such as a microwave oven starts to also demand power from the generator 112, the microwave oven is likely to increase the total power demand to above 85 percent of the maximum power or wattage capability. As a result, contacts for the second relay 154 connected to the hot water heater 164 will be opened, and the first relay 150 will remain closed unless the total current drawn by the microwave oven and the A/C 162 is still more than the preset percentage of the maximum power or wattage capability with the relay 154 of the hot water heater 164 being in the OPEN state. After the microwave oven stops drawing power from the generator 112, the contacts of the second relay 154 will be closed and thus adding the hot water heater 164 back.

When stepping loads on and off, the load-management-control board 144 waits for a preset amount of time, for example 5 seconds, before shedding or adding another prioritized load from or to the load-management-control board 144. In this way, the load-management-control board 144 has time to stabilize. When the load-management-control board 144 sees or detects a large current swing in demand, the load-management-control board 144 sheds the loads more quickly to prevent the generator 112 from overloading. Once the demand has stabilized, the loads can be added again. Specifically, the load-management-control board 144 will start adding the applied load with the highest priority available. Thereafter, the load-management-control board 144 waits for another preset amount of time, for example 5 seconds, and adds the next priority load. The load-management-control board 144 will continue to add load until all loads have been added, or until the preset maximum amount of rated load has been reached.

In an alternate lower cost embodiment, the load-management-control board 144 does not perform current monitoring, and does not include any current transformers. Instead, the load-management-control board 144 simply opens the relay contacts 150, 154 as soon as generator power is sensed. The relay contacts 150, 154 are kept open until utility power is sensed. Any appliances such as the A/C 162 or the hot water heater 164 that is electrically connected to the relays 150, 154 are locked out after the utility power from the utility source 116 has been restored. In such cases, the system 100 is less expensive since the CT's 192, 194 are eliminated, and thus controlling the relays 150, 154 is accordingly simplified.

In some other embodiments, the relays 150, 154 are selected to search or look for a voltage source that can come from either the load-management-control board 144, or the thermostat 158. As described, the relays 150, 154 are typically used to relay power to a load such as the A/C 162 and the hot water heater 164. If the relays 150, 154 have detected the activating (voltage or current) signal from the voltage source, the relays 150, 154 will start examining or detecting a current drawn or power demanded by the connected loads.

In the example that follows, without limitation, the relay 150 controls the power being supplied to the A/C 162, and the relay 154 controls the power being supplied to the hot water heater 164. Particularly, when the relay 150 does not detect any signal during a power outage, the relay 150 will remain open. However, when the relay 150 has detected an activating (voltage or current) signal from the voltage source such as the thermostat 158, the load-management-control board 144 can determine if there is enough power capacity to turn on or close the relay 150 to activate the A/C 162. If there is not enough power capacity, the relay 150 will remain open regardless of the state of relay 154. Furthermore, the load-management-control board 144 will continuously monitor the current in the relay 154 such that the load-management-control board 144 can determine if opening relay 154 will allow sufficient power to be supplied to the A/C 162 by closing relay 150. If there is sufficient power capacity to run the A/C 162, the load-management-control board 144 will open the relay 154 to disconnect power from the hot water heater 164, and will close the relay 150 to activate the A/C 162.

Furthermore, after the relay 150 has detected the activating signal, the power that can potentially be drawn by the load through the relays 150 and 154 is further examined. Once the total power that can potentially be drawn by the A/C 162 and the hot water heater 164 has been determined, the load-management-control board 144 determines if the available power is enough to power the A/C 162 while keeping the relay 154 closed. If the power is insufficient for the A/C 162, the load-management-control board 144 will keep the relay 150 open regardless of the status of the relay 154.

Still furthermore, the load-management-control board 144 will also be constantly monitoring the current at the relay 154. In this way, the load-management-control board 144 can determine if opening the relay 154 will provide sufficient power to close the relay 150. If the load-management-control board 144 determines that opening up the relay 154 can provide sufficient power to the A/C 162, the relay 154 is opened or turned off. When the relay 154 is opened, the power is discontinued from the hot water heater 164, and the relay 150 is closed or turned on to provide power to the A/C 162.

FIG. 4 depicts a second exemplary load management system 400 disposed in the residence of FIG. 1. The second exemplary load management system 400 includes a main breaker panel box 404 that is connected to a transfer switch 408, and a plurality of loads. In the embodiment depicted in FIG. 4, the loads include an air conditioner 412 and a hot water heater 416. Particularly, the main breaker panel 404 is connected to the air conditioner 412 via a local disconnect 420, and to the hot water heater 416 via a contactor 424. The transfer switch 408 receives the utility power through a watt-hour-meter 428 and a service-disconnect 432. The transfer switch 408 also receives power from a generator 436. Furthermore, the main breaker panel 404 can also be connected to a plurality of circuits via some branch circuit outlets 440 in a known manner. In the embodiment depicted in FIG. 4, the transfer switch 408 also includes the load-management-control board 144 (see FIG. 2). However, the load-management-control board 144 can also be implemented or installed in the main breaker panel box 404, in some other embodiments.

Figure 5:
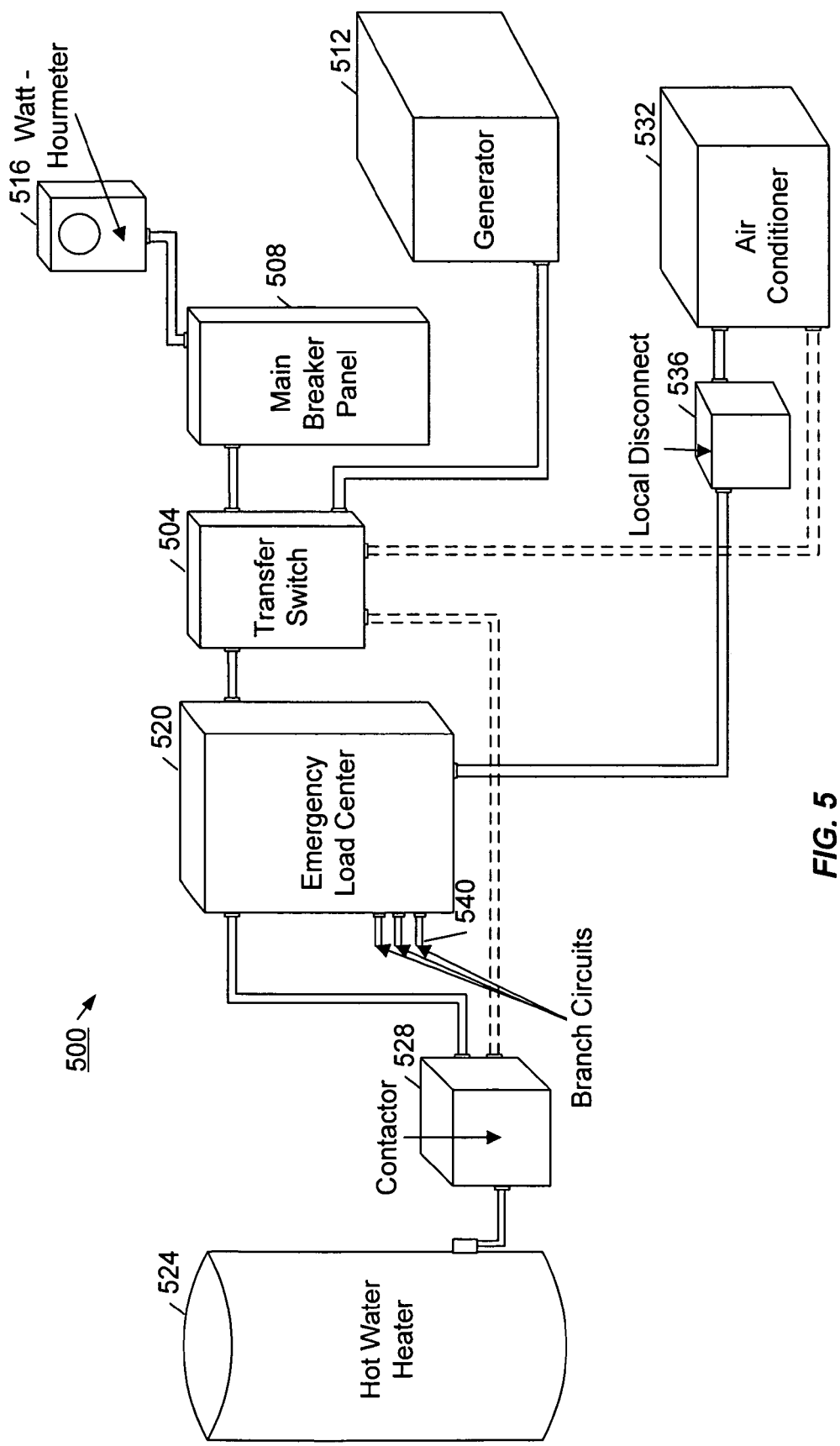
FIG. 5 is a third residential electrical system having a load management system.

FIG. 5 depicts a third exemplary load management system 500. The third exemplary load management system 500 also includes a transfer switch 504 that is connected to a main breaker panel box 508 and a generator 512. The main breaker panel 508 receives utility power via a watt-hour-meter 516. The transfer switch 504 is also connected to an emergency load center 520. The emergency load center 520 is connected to a plurality of loads through contactors or a local disconnect. For example, the emergency load center 520 can be connected to a hot water heater 524 via a contactor 528. For another example, the emergency load center 520 can be connected to an air conditioner or an air conditioning unit 532 via a local disconnect 536. The emergency load center 520 can also be connected to other circuits via a plurality of circuit outlets 540. In the embodiment depicted in FIG. 5, the load-management-control board 144 is installed in the transfer switch 504. However, the load-management-control board 144 can also be implemented in the emergency load center 520, in some other embodiments.

Figure 6:
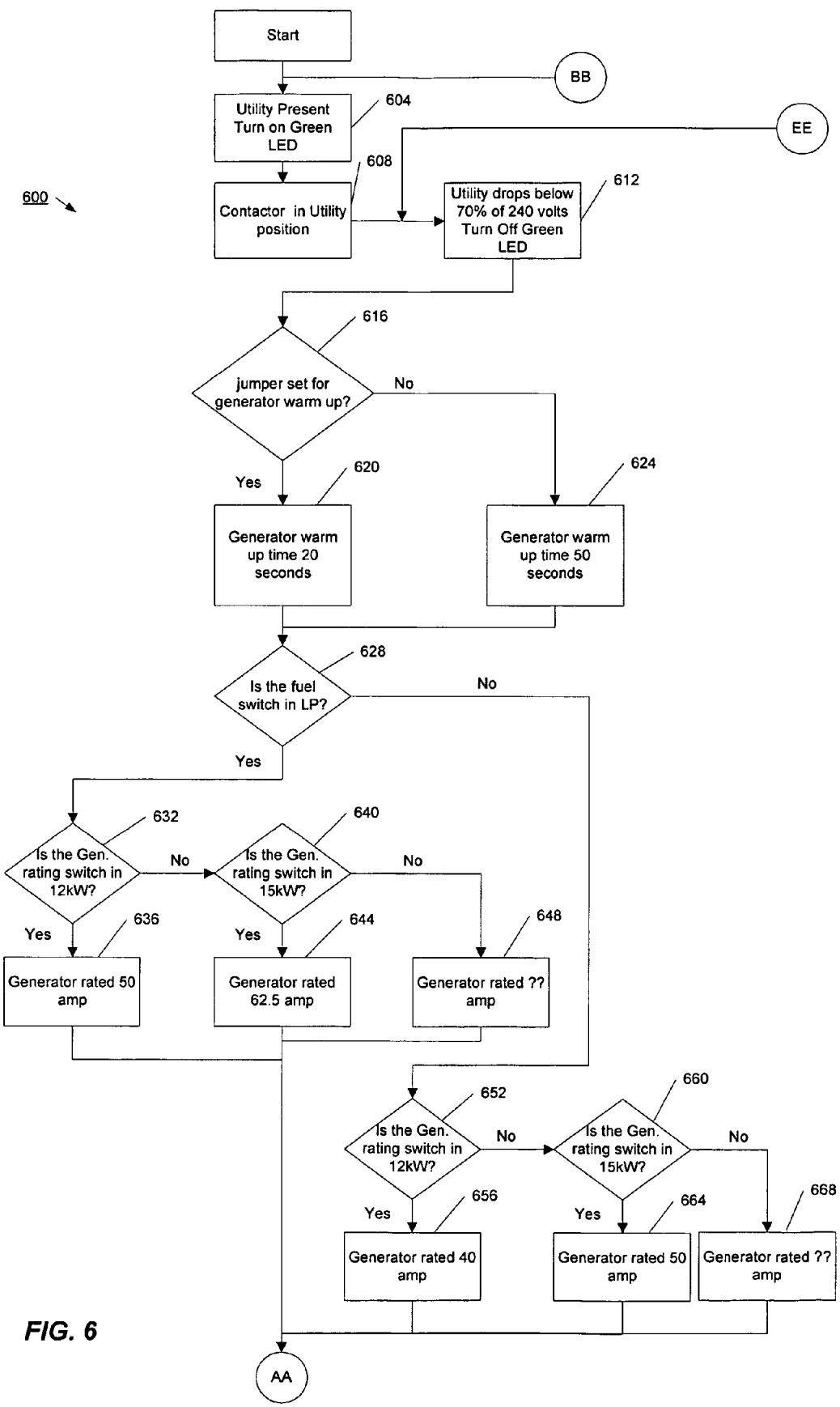
FIG. 6 is a flow chart of processing carried out in embodiments of the invention.

FIG. 6 includes a flow chart 600 that further illustrates processes that occur in some embodiments including processes that may be carry out by software, firmware, or hardware. At block 604, the load-management-control board 144 turns on a green light-emitting diode ("LED") at block 604, when the utility power is present. The load-management-control board 144 then sets the contactor 170 (of FIG. 1) in the utility position at block 608. The load-management-control board 144 also turns off the green LED, when the utility power drops below a preset percentage of the utility voltage at block 612. In some embodiments, the preset percentage is about 70 percent when the utility voltage is 240 volts. Although the flowchart 600 calls for a green LED, other LED's or other indicators can also be used.

At block 616, the load-management-control board 144 checks to see if the generator 436 or 512 needs to be warmed up, depending on a jumper setting on the load-management-control board 144. When the utility power drops below the preset percentage, and the jumper settings on the load-management-control board 144 are set for a specific generator warm up, the load-management-control board 144 starts to warm up the generator for a first preset amount of time at block 620. In some embodiments, the first preset amount of time is about 20 seconds. However, if the jumper settings on the load-management-control board 144 are not set for a specific generator warm up, the load-management-control board 144 starts to warm up the generator 436, 512 for an alternate preset amount of time at block 624 in default. In some embodiments, the second preset amount of time is about 50 seconds.

The load-management-control board 144 checks the fuel switch and jumper settings as indicated in FIG. 3 at block 628. Particularly, the load-management-control board 144 checks to determine if the fuel switch and jumper settings are in the LP position at block 628. If the fuel switch settings are in the LP position as determined at block 628, and if the generator rating is 12 KW as determined at block 632, the load-management-control board 144 presets a power or current rating for the generator 436, 512 at about 50 Amps at block 636. If the current rating for the generator 436, 512 is set in a 15 KW position as determined at block 640, the load-management-control board 144 then sets the current rating for the generator 436, 512 at 62.5 A at block 644. However, if the generator 436, 512 is not in the 15 KW position or the 12 KW position as determined at block 640, the load-management-control board 144 sets the generator 436, 512 at other amounts of current at block 648. For example, the amount of current can be 41.7 A if the generator 436, 512 is rated at 10 KW. For another example, the load-management-control board 144 can set the current rating for the generator 436, 512 at 70.8 A if the generator is rated at 17 KW. However, if it is determined at block 628 at the fuel switches are not at the LP position, the load-management-control board 144 then checks to determine the fuel switches setting to determine if the setting is at 12 KW at block 652. If the generator rating is set at 12 KW as determined at block 652, the load-management-control board 144 then sets the current rating of the generator 436, 512 at about 40 A at block 656. However, if the generator rating is set at 15 KW as determined at block 660, the load-management-control board 144 sets the current rating at about 50 A at block 664. Otherwise, if the generator rating is not set either at 12 KW or at 15 KW, the load-management-control board 144 sets the current rating at other amounts at block 668.

Figure 6A:
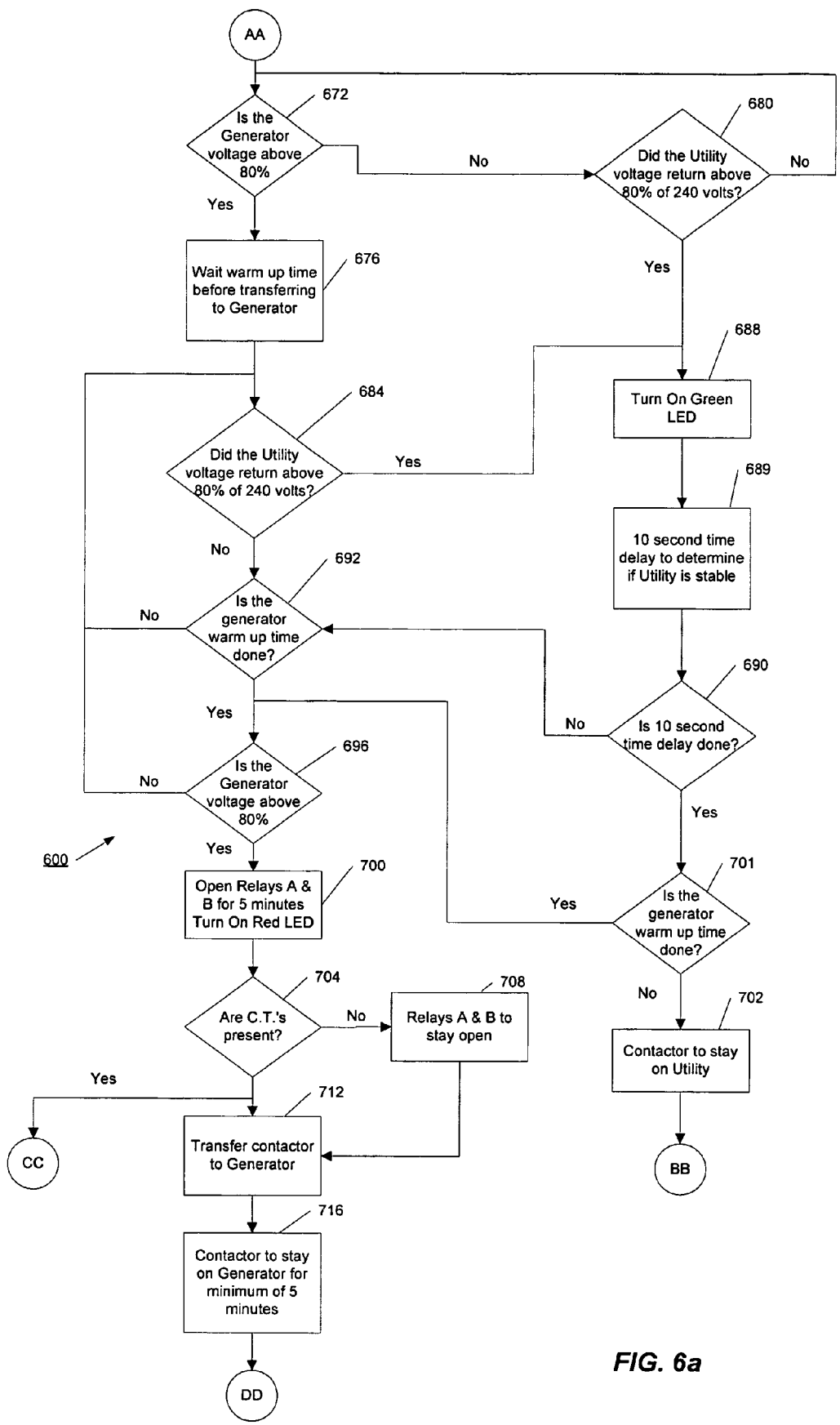
FIG. 6a is a continuation of the flow chart of FIG. 6.

As depicted in FIG. 6a, which is a continuation of the flow chart 600 in FIG. 6, the load-management-control board 144 then checks the generator voltage at block 672. If the generator voltage is above a second preset percentage as determined at block 672, the load-management-control board 144 starts a delay such that the generator 436 or 512 can be warmed up before power is transferred to the generator 436 or 512 at block 676. However, if the generator voltage is not above the second preset percentage as determined at block 672, the load-management-control board 144 checks to determine if the utility voltage is above the second preset percentage at block 680. If the utility voltage is not above the second preset percentage as determined at block 680, operation at block 672 is repeated. Otherwise, if the utility voltage is above the second preset percentage as determined at block 680, the green LED is turned at block 688, the load-management-control board 144 starts a delay for about 10 seconds to determine if the utility power is stable at block 689, and checks to determine if the delay has elapsed at block 690.

Once the load-management-control board 144 has started the delay before transferring power to the generator 436, 512 at block 676, the load-management-control board 144 checks to determine if the utility voltage is above the second preset percentage at block 684. If the utility voltage is above the second preset percentage as determined at block 680 or at block 684, the load-management-control board 144 turns on the green LED at block 688. However, if it is determined that the utility voltage is not above the second preset percentage at block 684, the load-management-control board 144 continues to check if the generator 436, 512 warm up time at block 692 has run out. If it is determined at block 692 that the warm up time for the generator 436, 512 has not run out, the load-management-control board 144 continues or repeats block 684. If it is determined at block 692 that the warm up time has run out, the load-management-control board 144 again checks to determine if the generator voltage is above the second preset percentage at block 696. If it is determined at block 696 that the generator voltage is not above the second preset percentage, the load-management-control board 144 repeats the block 684. Otherwise, if it is determined at block 696 that the generator voltage is above the second preset percentage, the load-management-control board 144 opens both of the relays 150, 154 for a third preset amount of time at block 700. The load-management-control board 144 also turns on a red LED at block 700. In some embodiments, the third preset amount of time is about five minutes.

Referring back to block 690, if the delay has not elapsed, the load-management-control board 144 checks to determine if the generator 412, 536 has warmed up for an amount of time at block 701. If the generator 412, 536 has warmed up for the amount of time as determined at block 701, the load-management-control board 144 starts the operation at block 696. Otherwise, if the generator 412, 536 has not warmed up for the amount of time as determined at block 701, the load-management-control board 144 keeps the contactor 170 (of FIG. 2) at the utility position at block 702, and repeats block 604.

Continuing with reference to block 700, the load-management-control board 144 then checks to determine if both of the CT's 192, 194 are present at block 704. If it is determined at block 704 that the CT's 192, 194 are absent from the load-management-control board 144, the load-management-control board 144 keeps both of the relays 150, 154 open at block 708. Thereafter, the load-management-control board 144 transfers the contactor to the generator position at block 712. However, if the CT's 192, 194 are present at block 704, the load-management-control board 144 starts to transfer the contactor 170 to the generator position at block 712 and keep the contactor 170 at the generator position at block 716 for a minimum amount of time. In some embodiments the minimum amount of time is about five minutes.

Figure 6B:
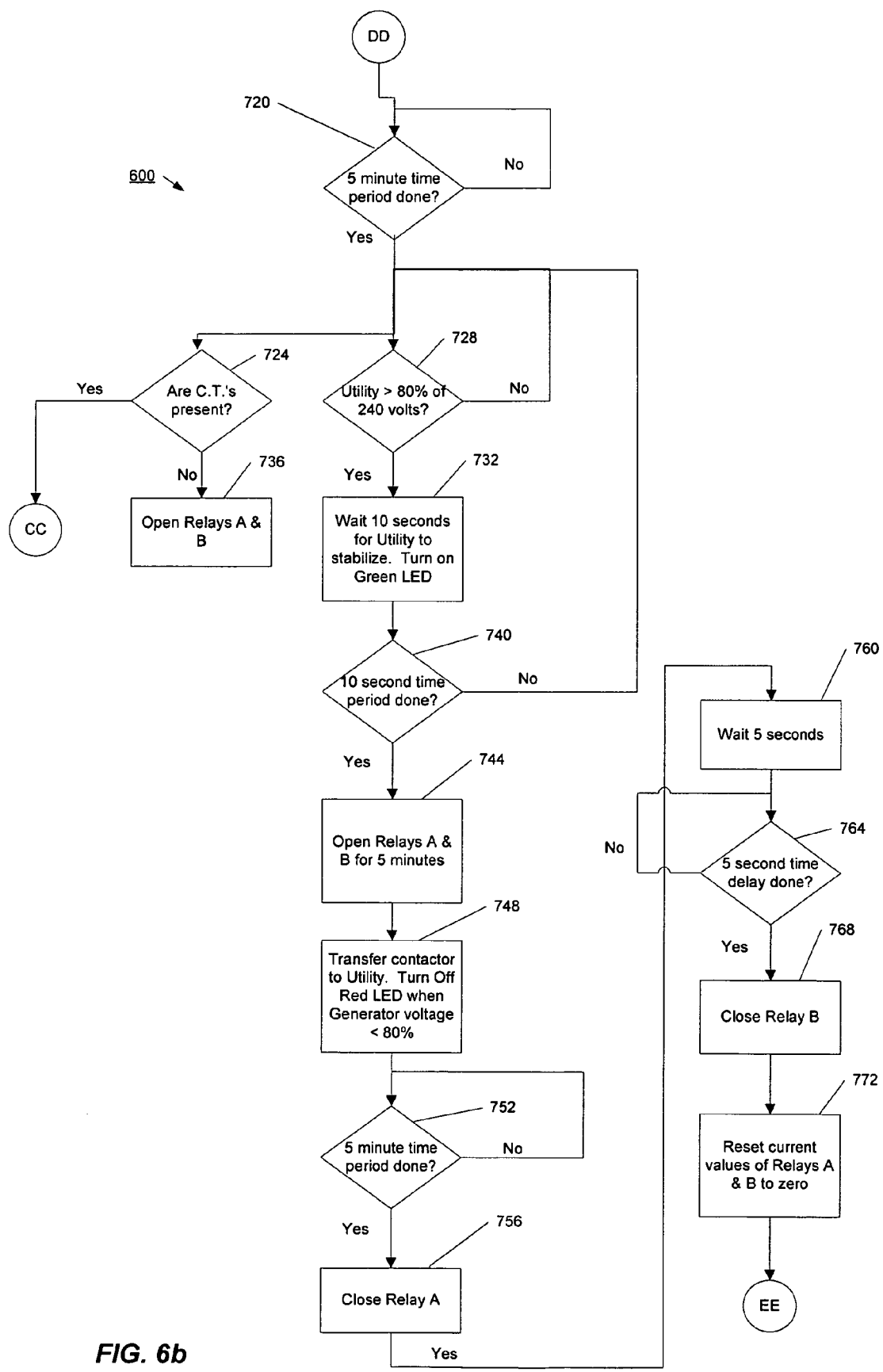

As depicted in FIG. 6b which is a continuation of the flow chart 600 of FIG. 6a, if the minimum amount of time has elapsed as determined at block 720, the load-management-control board 144 performs a plurality of operations. For example, the load-management-control board 144 continues to check if the CT's 192, 194 are present at block 724, and checks if the utility voltage is above the second preset percentage at block 728. If it is determined at block 728 that the utility voltage is above the second preset amount of percentage, the load-management-control board 144 will allow an amount of time (for example, 10 seconds) for the utility power to stabilize, and turns on the green LED at block 732. However, if the utility voltage has not returned to the second preset percentage as determined at block 728, blocks 724 and 728 are repeated. If it is determined at block 724 that the CT's 192, 194 are absent, the load-management-control board 144 will open both relays 150, 154.

However if it is determined at block 724 that the CT's 192, 194 are present, the load-management-control board 144 will carry out a series of operations discussed below. If the load-management-control board 144 has determined that the amount of time for the utility to stabilize has elapsed at block 740, the load-management-control board 144 opens up both of the relays 150, 154 for an amount of time, for example five minutes.

Because the utility has returned to above the second preset percentage and the pre-selected amount of time has elapsed for the utility power to stabilize, the load-management-control board 144 then moves the contactor 170 from the generator position back to the utility position, and turns off a red LED when the generator voltage is less than the second preset percentage at block 748. Once the relays 150, 154 have been opened for the amount of time set by the load-management-control board 144 as determined at block 752, the load-management-control board 144 closes the relay 150 at block 756. Otherwise, the load-management-control board 144 will wait until the amount of preset time to elapse (that is, repeats block 752).

Once the relay 150 is closed, or in the CLOSED state at block 756, the load-management-control board 144 starts to wait for a fourth preset amount of time at block 760. In some embodiments the fourth preset amount of time is about 5 seconds. The load-management-control board 144 then waits for the fourth preset amount of time to elapse at block 764. Once the fourth preset amount of time has elapsed as determined at block 764, the load-management-control board 144 then closes the relays 154 at block 768, and resets the recorded current values of the relays 150, 154 at block 772. The load-management-control board 144 then repeats the operation starting at block 612.

Figure 6C:
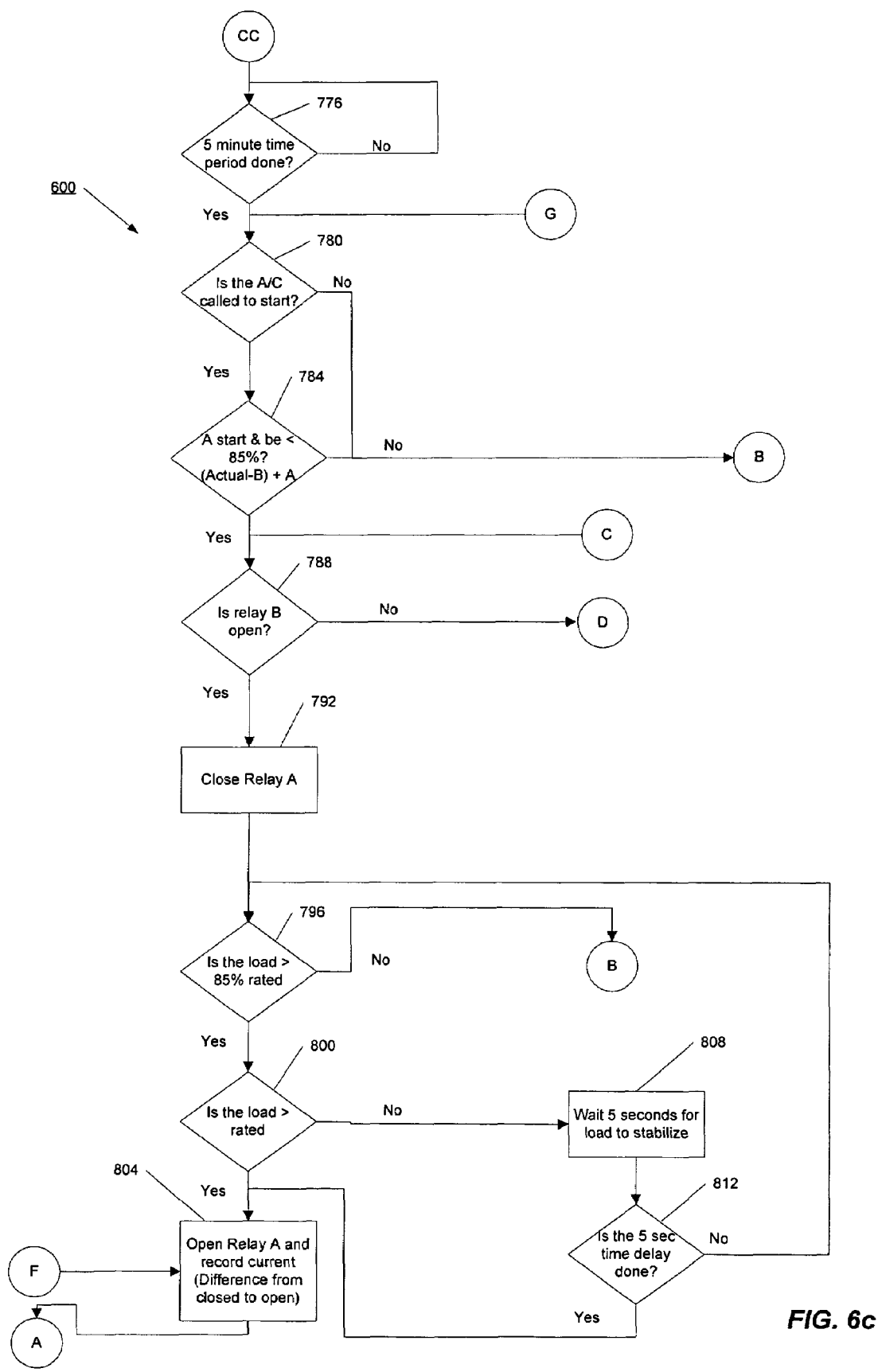
FIG. 6c is a continuation of the flow chart of FIG. 6b.

Referring to FIG. 6c, which is a continuation of the flow chart 600 of FIG. 6a, and referring back to blocks 704 (FIG. 6) and 724 (FIG. 6a), when the load-management-control board 144 has determined that the CT's 192, 194 are present, the load-management-control board 144 determines if an appropriate amount of time has elapsed at block 776. In some embodiments, the appropriate amount of time is about five minutes. Once the appropriate amount of time has elapsed as determined at block 776, the load-management-control board 144 checks to determine if the A/C unit 412 is about to start at block 780. If the A/C unit 412 is about to start as determined at block 780, the load-management-control board 144 checks to determine if starting the A/C unit 412 will result in a total current demand being less than a specific amount, for example 85 percent at block 784. In some embodiments, the total current demand can be determined by adding the current demanded by the A/C unit 412 unit to a difference between the actual current available from the generator 436 and the current demanded by the hot water heater 416. If it is determined at block 784 that the total current demand is less than the preset amount, the load-management-control board 144 checks to determine if the relay 154 is open at block 788. Otherwise, if the total current demand is not less than the preset percentage as determined at block 784, or if the A/C unit 412 is not about to start, the load-management-control board 144 starts operating at block 828 (FIG. 6*e*) as discussed below. If it is determined that the relay 154 is open at block 788, the load-management-control board 144 closes the relay 150 at block 792. If it is determined at block 788 that the relay 154 is not open, the load-management-control board 144 carries out other operations as discussed below.

If it is determined at block 796 that the current demand is greater than a percentage (for example, 85 percent) of the rated generator current, the load-management-control board 144 continues to check if the current demand is greater than the total rated generator current at block 800. If it is determined at block 800 that the current demand is more than the total rated generator current, the load-management-control board 144 opens the relay 150 and records a current difference between the current drawn when the relay 150 is closed and the current drawn when the relay 150 is open at block 804. However, if it is determined at block 800 that the current demand is less than the total rated generator current, the load-management-control board 144 waits for a preset amount of time, for example five seconds, for the loads to stabilize at block 808. Once the load-management-control board 144 has waited for the preset amount of time as determined at block 812, the operation in block 804 is repeated. Otherwise, if the load-management-control board 144 has not waited for the preset amount of time, the load-management-control board 144 continues to check the current demand at block 796.

Figure 6D:
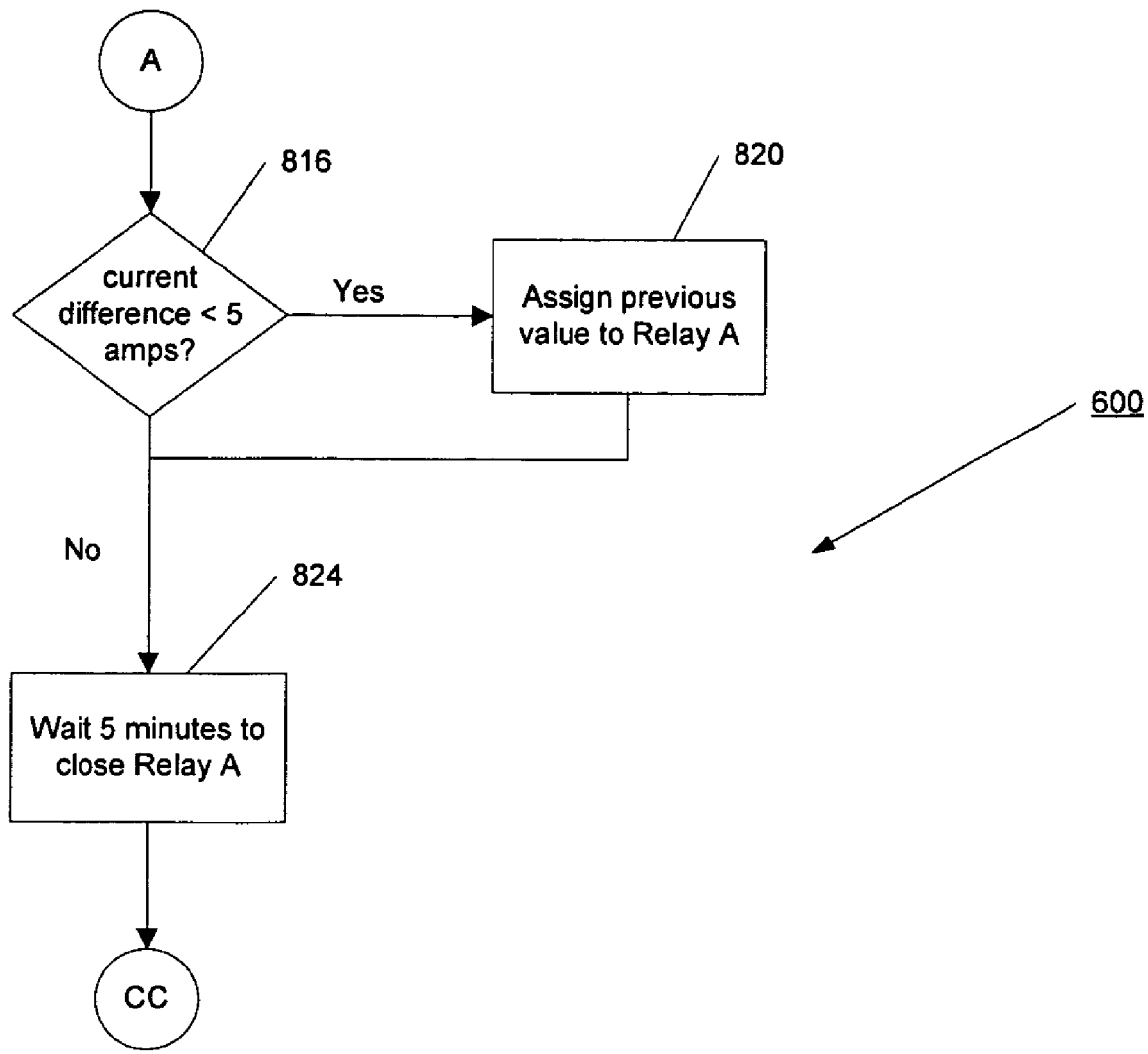
FIG. 6d is a continuation of the flow chart of FIG. 6c.

Referring to FIG. 6*d*, which is a continuation of the flow chart 600 of FIG. 6*c*, after the relay 150 is open at block 804, the load-management-control board 144 continues to determine the current difference at block 816. Particularly, if the current difference is less than a preset amount (for example, 5 A) at block 816, the load-management-control board 144 assigns a previously determined current value to the relay 150 at block 820. Otherwise, if the current difference is not less than the preset amount, or after the load-management-control board 144 has assigned the previously determined current value to the relay 150 at block 820, the load-management-control board 144 starts a delay, for example five minutes, at block 824. Thereafter operations in block 776 are repeated.

Figure 6E:
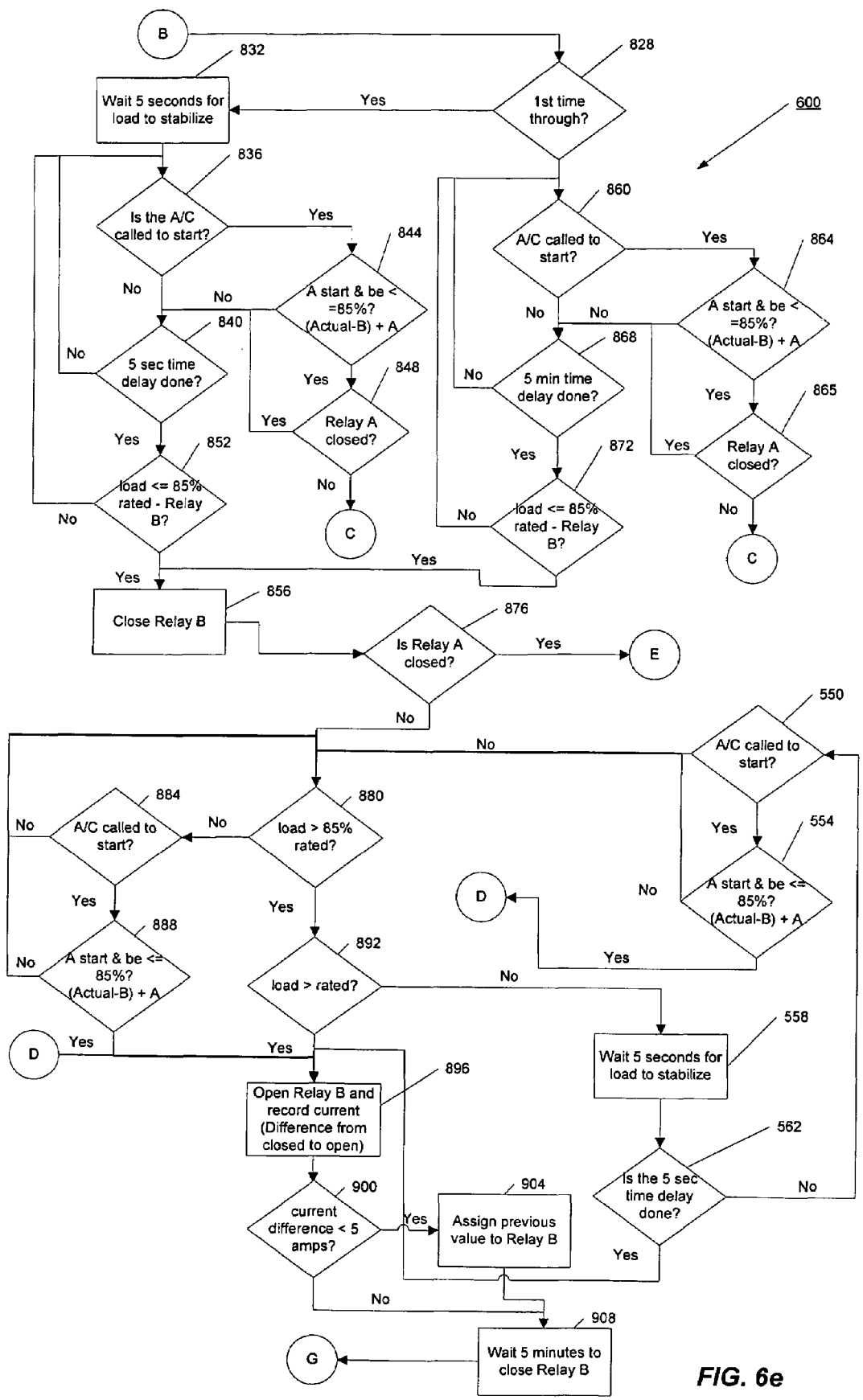
FIG. 6e is a continuation of the flow chart of FIG. 6d.

Referring to FIG. 6*e*, which is a continuation of the flow chart 600 of FIG. 6*d*, if the current demand is less than the preset percentage of the rated generator current as determined at block 796 (of FIG. 6*c*), the load-management-control board 144 checks to determine if it is a first rating check at block 828. If it is determined at block 828 that it is the first rating check, the load-management-control board 144 waits for a set amount of time, for example five seconds, for the loads to stabilize at block 832. The load-management-control board 144 then checks to determine if the A/C unit is about to start at block 836. If the A/C unit is not about to start as determined at block 836, the load-management-control board 144 checks to determine if a set amount of time (for example 5 seconds) has elapsed at block 840. However, if the A/C unit is about to start as determined at block 836, the load-management-control board 144 checks to see if closing the relay 150 will result in the current drawn being less than a preset amount of current, for example 85 percent, at block 844. If it is determined at block 844 that closing the relay 150 will not result in the current drawn being less than the preset amount of current, block 840 is repeated. Otherwise, if it is determined at block 844 that closing the relay 150 will result in the current drawn being less than the preset amount of current, the load-management-control board 144 checks to determine if the relay 150 is closed at block 848. If it is determined at block 848 that the relay 150 is closed, block 840 is repeated. If it is determined at block 840 that a delay (for example 5 seconds) has not elapsed, block 836 is repeated. Otherwise, if it is determined at block 840 that a delay (for example 5 seconds) has elapsed, the load-management-control board 144 checks to determine if the current demand is at most equal to a second difference between a percentage (for example 85 percent) of the rated generator current and the current value at the relay 154 at block 852. If the current demand is not less than the second difference, block 836 is repeated. Otherwise, if the current demand is less than the second difference, the relay 154 is closed at block 856. In this way, both of the relays 150, 154 are in a CLOSED state. As a result, power can be supplied to both the A/C unit and the hot water heater.

Referring back to block 828, if it is determined at block 828 that it is not the first rating check, the load-management-control board 144 checks to determine if the A/C unit is about to start at block 860. If the A/C unit is about to start as determined at block 860, the load-management-control board 144 checks to determine if closing the relay 150 will result in the current drawn being less the preset current percentage (for example 85 percent) at block 864. If it is determined at block 864 that the A/C unit is not about to start as determined at block 860, or closing the relay 150 will not result in the current drawn being less the preset current percentage, the load-management-control board 144 repeatedly checks to determine if a time delay, for example five minutes, has elapsed at block 868. If it is determined at block 868 that the time delay has elapsed, the load-management-control board 144 checks to determine if the current demand is less than the second difference at block 872 as described earlier. If it is determined at block 872 that the current demand is not less than the second difference, block 860 is repeated. Otherwise, if the current drawn by the load as determined at block 872 is less than the second difference, block 856 is repeated.

Once the relay 154 is closed, or in the CLOSED state, the load-management-control board 144 determines if the relay 150 is in the CLOSED state or closed at block 876. If the relay 150 is not closed, as determined at block 876, the load-management-control board 144 determines if the current demand is greater than the preset percentage of the rated generator current at block 880. If it is determined at block 880 that the current demand is at most equal to the percentage rated, the load-management-control board 144 checks to determine if the A/C unit is about to start at block 884, and determines if starting the A/C unit can result in the current demand being less than the preset percentage at block 888. If the A/C unit has not called to start as determined at block 884, or starting the air conditioning unit is not less than the difference, block 880 is repeated. If the current demand is greater than the percent rated as determined at block 880, the load-management-control board 144 checks to determine if the current drawn by the load is greater than the total current rated at block 892.

If it is determined at block 880 that the load current is less than the preset amount, at block 884 that the A/C unit is about to start, and at block 888 that starting the A/C unit can result in the current drawn being less than the preset percentage, or at block 892 that the current demand is greater than the total rated generator current, the load-management-control board 144 opens the relay 154 and records the current difference between the closed state and the open state of the relay 154 at block 896. If, however, if the current demand is less than the total rated generator current as determined at block 892, the load-management-control board 144 starts a delay (for example 5 seconds) for the load to stabilize at block 558, waits the delay to elapse at block 558, and repeats block 896 or repeats block 550 (will be detailed below) depending on the elapse of the delay determined at block 562. The load-management-control board 144 then determines if the current difference is less than some preset amount (for example 5 A) at block 900. If it is determined at block 900 that the current difference is less than the preset amount, the load-management-control board 144 assigns a previously determined current value to the relay 154 at block 904. Otherwise, if the current difference is greater than or equal to the preset amount, as determined at block 900, the load-management-control board 144 starts a delay (for example five minutes) at block 908, and repeats block 780 after the delay. Referring back to block 876 that if the relay 150 is not closed, block 880 is repeated.

At block 550, the load-management-control board 144 checks if the A/C unit is about to start. The load-management-control board 144 also checks if starting the A/C unit can result in the current drawn being less than the preset amount at block 554. If closing the relay 150 can result in the current drawn being less than the preset amount as determined at block 554, block 896 is repeated. If closing the relay 150 can not result in the current drawn being less than the preset amount as determined at block 554, block 880 is repeated.

Figure 6F:
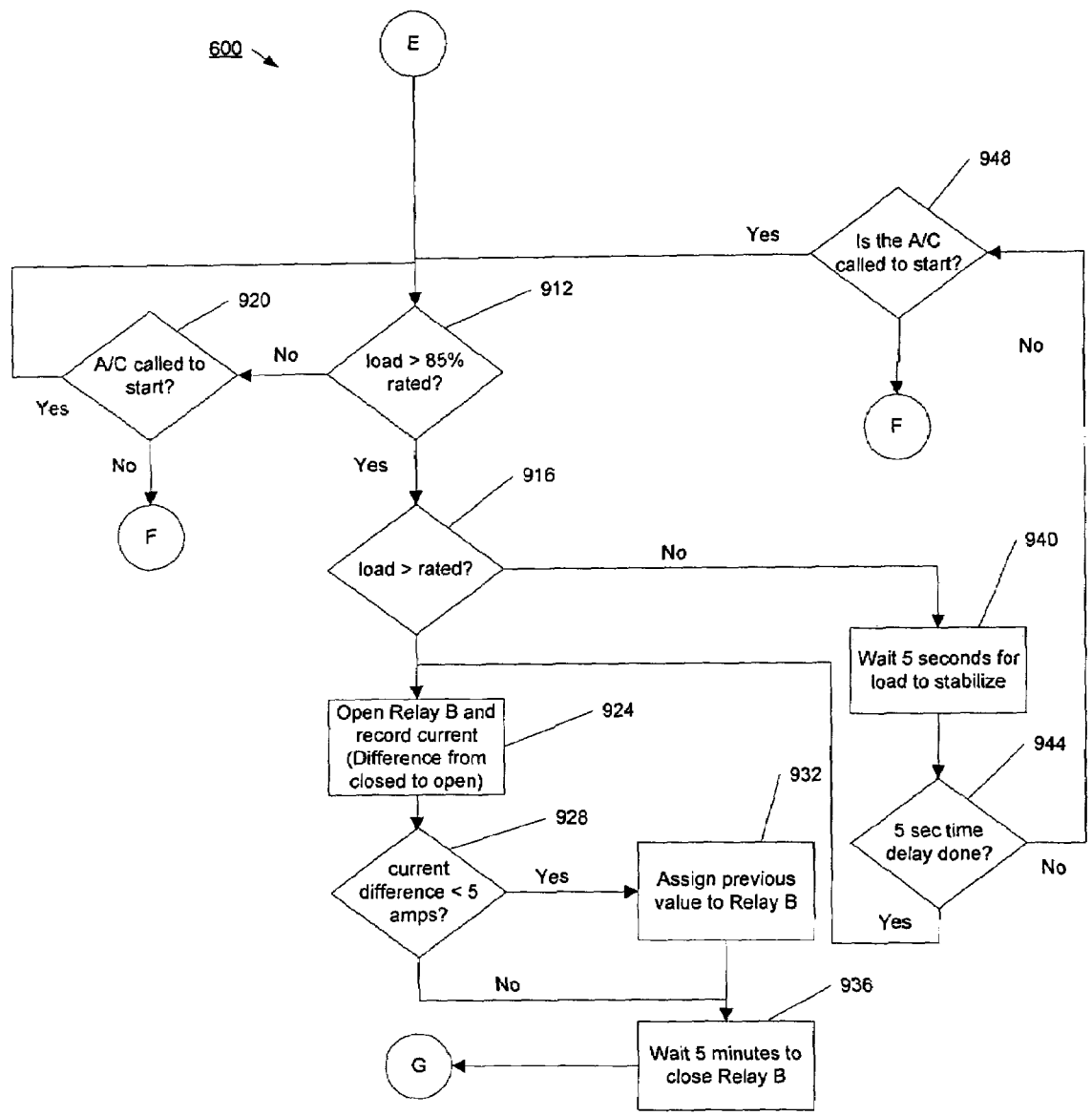
FIG. 6f is a continuation of the flow chart of FIG. 6e.

Referring to FIG. 6f which is a continuation of the flow chart 600 of FIG. 6e, and to block 876 that if the relay 150 is closed, the load-management-control board 144 checks to determine if the current demand is greater than the preset percentage of rated generator current at block 912. If the current demand is greater than the preset percentage of rated generator current as determined at block 912, the load-management-control board 144 checks to determine if the current demand is greater than the total rated generator current at block 916. Otherwise if the current demand is less than the preset percentage of rated generator current as determined at block 912, the load-management-control board 144 checks to determine if the A/C unit is about to start at block 920. If the A/C unit is not about to start as determined at block 920, block 804 is repeated. Otherwise, if the A/C unit is about to start as determined at block 920, block 912 is repeated.

If it is determined at block 916 that the current demand is greater than the total rated generator current, the load-management-control board 144 opens the relay 154 and records the current difference at block 924. If the current difference is less than the preset amount as determined at block 928, the load-management-control board 144 assigns a previously determined current value to the relay 154 at block 932. Otherwise, if the current difference is not less than the preset amount as determined at block 928, the load-management-control board 144 starts a delay, for example five minutes, at block 936. Thereafter, the load-management-control board 144 repeats block 780.

Referring back to block 916, if the current demand is not greater than the total rated generator current, the load-management-control board 144 waits for a preset amount of time, for example five seconds, for the loads to stabilize at block 940, and checks to determine if a delay (for example 5 seconds) has elapsed at block 944. If the delay has elapsed as determined at block 944, block 924 is repeated. Otherwise, if the delay has not elapsed as determined at block 944, the load-management-control board 144 checks to determine if the A/C unit is about to start at block 948. If the A/C unit is about to start as determined at block 948, block 912 is repeated. Otherwise, if the A/C unit is not about to start as determined at block 948, the load-management-control board 144 repeats block 804.

Thus, the invention provides, among other things, a load management system. Various features and advantages of the invention are set forth in the following claims.

What is claimed is:

1. A method of managing one or more electrical loads of a residence with a load management system configured to be powered by a residential generator, the residence having a thermostat and an air-conditioning system and further having a load unrelated to the air-conditioning system, the load management system having a first signal-responsive switch connectable in circuit between the residential generator and the load, the load management system further having a second signal-responsive switch connectable in circuit between the thermostat and the air-conditioning system, the method comprising:

closing the first signal-responsive switch to permit a current from the residential generator to the load;

receiving a call from the thermostat requesting conditioned air, including receiving the call at the second signal-responsive switch;

interrupting the call with the second signal-responsive switch;

opening the first signal-responsive switch to prevent the current from the residential generator to the load based on receiving the call;

providing the call to the air conditioning system, including closing the second signal-responsive switch; and closing the first signal-responsive switch based on the cessation of the call.

2. A method as set forth in claim 1 wherein the method further comprises generating a signal and applying the signal to the first signal-responsive switch, and wherein the closing the first signal-responsive switch is in response to the applying the signal.

3. A method as set forth in claim 2 wherein the method further comprises generating a second signal after receiving the call and applying the second signal to the first signal-responsive switch, and wherein the opening the first signal-responsive switch is in response to the applying the second signal.

4. A method as set forth in claim 1 wherein the providing the call occurs after the opening the first signal-responsive switch.

5. A method as set forth in claim 1 wherein the method further comprises determining whether the residential generator can power both the air-conditioning system and the load after the receiving the call and determining whether the residential generator can power the air-conditioning system after receiving the call, and wherein the opening the signal-responsive switch occurs when the residential generator cannot power both the air-conditioning system and the first load, but can power the air-conditioning system.

6. A method as set forth in claim 1 wherein the signal-responsive switch comprises a relay.

7. A load management system for managing one or more electrical loads of a residence, the residence having a thermostat, an air-conditioning system, and a load unrelated to the air-conditioning system, the load management system configured to be powered by a residential generator, the load management system comprising:

a first signal-responsive switch adapted to be connected in circuit between the residential generator and the load, the first signal-responsive switch configured to permit a first current from the residential generator to the load;

a second signal-responsive switch configured to be connected in circuit between the thermostat and the air-conditioning system, the second signal-responsive switch configured to permit a second current from the thermostat to the air-conditioning system; and a controller connected to the first signal-responsive switch and to the second signal-responsive switch, the controller being configured to open the second signal-responsive switch, close the first signal-responsive switch to permit the first current from the residential generator to the second load, receive a call from the thermostat requesting conditioned air, open the first signal-responsive switch to prevent the first current from the residential generator to the load based on receiving the call, and close the second signal-responsive switch to permit the second current from the thermostat to the air-conditioning system, thereby providing the call to the air-conditioning system.

8. A load management system as set forth in claim 7, wherein the controller is further configured to, after providing the call, receive a cessation of the call from the thermostat to cease the request of conditioned air, open the second signal-responsive switch to prevent the second current from the thermostat to the air-conditioning system after the receiving the cessation, and close the first signal-responsive switch to permit the current from the residential generator to the load after the opening the second signal-responsive switch.

9. A load management system as set forth in claim 7, wherein the load management system further comprises a sensor adapted to sense first and second electrical signals associated with the load and the air-conditioning system, respectively, wherein the controller is further connected to the sensor, and wherein the controller is further configured to determine, after receiving the call, whether the power required from the residential generator for both the air-conditioning system and the load would exceed a preset value, the determination being based on the first and second electrical signals, determine whether the residential generator can power the air-conditioning system after the receiving the call without exceeding the preset value, the second determination being based on the second electrical signal, and open the first signal-responsive switch when providing power to both the air-conditioning system and the first load would exceed the preset value, but powers the air-conditioning system and not powering the load would not exceed the preset value.

10. A load management system as set forth in claim 9, wherein the sensor comprises a first current transformer associated with the load and a second current transformer associated with the air conditioner.

11. A load management system as set forth in claim 7, wherein the first and second signal-responsive switches comprise first and second relays, respectively.

* * * * *